United States Patent [19]

Croslin

[11] Patent Number: 5,838,660
[45] Date of Patent: Nov. 17, 1998

[54] DYNAMIC RESTORATION PROCESS

[75] Inventor: William D. Croslin, Colorado Springs, Colo.

[73] Assignee: MCI Communications Corporation, Washington, D.C.

[21] Appl. No.: 749,168

[22] Filed: Nov. 14, 1996

[51] Int. Cl.$^6$ ........................................... H04J 1/16
[52] U.S. Cl. ............................. 370/216; 370/252
[58] Field of Search .................. 370/395, 216, 370/252, 254, 253, 251, 389, 241, 247, 248, 406, 405, 407, 401, 400, 408; 395/181, 181.03; 340/827, 825.01, 825.03; 379/221, 32

[56] References Cited

U.S. PATENT DOCUMENTS

| | | | |
|---|---|---|---|
| 4,999,829 | 3/1991 | Fite, Jr. et al. | 370/216 |
| 5,016,243 | 5/1991 | Fite, Jr. | 370/216 |
| 5,163,042 | 11/1992 | Ochiai | 370/238 |
| 5,173,689 | 12/1992 | Kusano | 340/827 |
| 5,182,744 | 1/1993 | Askew et al. | 370/216 |
| 5,218,601 | 6/1993 | Chujo et al. | 370/252 |
| 5,235,599 | 8/1993 | Nishimura et al. | 371/11.2 |
| 5,278,977 | 1/1994 | Spencer et al. | 395/575 |
| 5,341,364 | 8/1994 | Marra et al. | 370/238 |
| 5,596,719 | 1/1997 | Ramakrishnan et al. | 370/238 |
| 5,608,721 | 3/1997 | Nataragan et al. | 370/238 |

Primary Examiner—Dang Ton

[57] ABSTRACT

A method and apparatus is provided for dynamically generating routes within a diverse interconnected network which may be in a state of flux. This routing process will utilize node source/target sets and route intersection sets to reduce route generation time. In addition, the routing process makes route costing an integral part of the process rather than a completely predefined portion of the data fed to the process, thus eliminating the need to rebuild the data fed to the process if costs need to be dynamically adjusted. Data defining connectivity within a network is gathered from an existing database of network interconnections (referred to here as the topology). An existing route within this topology is deemed to be non-viable due to some failure within the network. The invention will locate, if available, the optimal route around the network failure point utilizing short/long routing and route intersection sets.

8 Claims, 7 Drawing Sheets

Route Generation

Find Left-Hand / Right-Hand Route

Find Next Node Set

Find Best Route

Find Best Route

DYNAMIC RESTORATION PROCESS

RELATED APPLICATIONS

This application relates to U.S. patent application Ser. No. 08/673,415, entitled "Dynamic Restoration Process for a Telecommunications Network" (1643/475), 08/673,415, entitled "Dynamic Network Topology Determination" (1643/063), and 08/632,198, entitled "Minimum Common Span Network Outage Detection and Isolation" (1643/344) now U.S. Pat. No. 5,802,144.

FIELD OF THE INVENTION

The invention relates to telecommunication networks and more particularly to restoration of interrupted service therein.

BACKGROUND OF THE INVENTION

A service disruption within existing telecommunications networks is usually resolved by network operators who locate the failed path causing the disruption and reroute network traffic around the failed path. In rerouting the network traffic, network operators look to minimize the duration of the service interruption, to establish the most efficient alternate routing around the failure, and to minimize the cost of rerouting by using as few additional system facilities as possible. In so doing, the operator must devise a plan of routes between network nodes which will avoid the failed path, select the optimal route plan from those devised, and command the network switches to implement the routings specified by the selected route plan.

These tasks have also been accomplished in existing networks by means of intelligent nodes that perform much of the processing involved in isolating a failed path and switching to alternate paths. U.S. Pat. Nos. 5,278,977 to J. Spencer et al., 5,235,599 to Y. Nishimura et al., 5,218,601 to T. Chujo et al. and 5,173,689 to T. Kusano teach methods and process for restoring connection paths in networks of highly intelligent switching nodes. A conventional topology of a network consisting of intelligent switching nodes represents a significant investment to the network operator as each node in the network must have the processing power needed to identify a failed path, report it to other nodes on the network, and switch to an alternate path. As the connections within the network are constantly changing to cope with traffic requirements, each node must maintain a list or model of available communication paths or must participate in extensive handshaking protocols to establish an alternate path.

An alternative to the system of distributed highly intelligent nodes is a telecommunication network having a central site capable of controlling the connection of alternate routes. U.S. Pat. No. 5,182,744 to J. Askew et al. describes such a restoration system. The central site monitors communication paths for alarm signals from switching nodes. In case such an alarm is detected, an alternative routing plan is established and sent to the individual crossconnect nodes.

Even a centralized restoration system such as described by J. Askew et al. suffers from disadvantages in that each node in the network must poll its terminal equipment for failure alarms and process them for broadcast to the central site. In addition, the central site must continuously maintain a model or record of the current state of the network. Failure alarms generated at the switching node are then interpreted in terms of this model in order to select or devise an alternative routing. In current centralized network restoration systems, the central site takes up some of the processing load from the nodes within the network by supplying a routing plan in case of failure. It would be desirable to further concentrate restoration processing tasks at the central site by centrally processing node alarms to isolate failed network paths.

The previously identified related applications include a generalized process for dynamically restoring traffic in the event of an outage in a telecommunications network. A Centralized Processing System (CPS) receives alarms from communications ports of diverse network equipment (DNE) elements. The CPS then proceeds to analyze and correlate the alarms in an effort to isolate the location of the outage. In doing so, the CPS utilizes a Network Topology database that is preferably updated in real-time with topology data obtained directly from the DNE network. The CPS will then identify and prioritize all traffic-bearing trunks impacted by the outage. The CPS then generates and implements a restoral route for each impacted trunk by issuing appropriate reroute command to the DNEs. If a DNE responds with an indication that a command failed and that its particular restoral segment is not possible, the CPS updates Network Topology database to indicate this segment as unavailable and proceeds to generate another restoral route. After implementing a restoral route, the CPS verifies that traffic is restored. When the cause of the outage has been fixed, the CPS restores the original route.

In order for a CPS to implement a restoral route for an impacted trunk, an effective process is necessary.

Numerous prior art processes exist for finding routes between a diverse interconnected set of nodes. These processes use various methods to determine the shortest path/cheapest cost route between any two nodes. Each process attempts, to minimize the amount of time required to determine this optimal route. It is critical to dynamic network restoral in the event of a network outage, that the optimal route be determined as quickly as practical.

The prior art processes, while capable of determining an optimal route, do not allow sufficient flexibility during route determination to operate optimally in a dynamic environment. Prior art processes assume that the network topology in question is in a stable state and that the cost of utilizing a portion of the network will remain constant. If these assumptions do not hold true, extensive reconstruction of that data utilized by the process must be performed. It is critical that these assumptions not exist and that a reconstruction of topology/costing data not be required during the route generation process.

In view of these and other problems related to prior art systems, it is among the objects of the present invention to provide a flexible high-speed route generation process more suited to a dynamic network environment.

SUMMARY OF THE INVENTION

Accordingly, the present invention provides a method and apparatus for dynamically generating routes within a diverse interconnected network which may be in a state of flux. This routing process will utilize node source/target sets and route intersection sets to reduce route generation time. In addition, the routing process makes route costing an integral part of the process rather than a completely predefined portion of the data fed to the process, thus eliminating the need to rebuild the data fed to the process if costs need to be dynamically adjusted.

By the invention, data defining connectivity within a network is gathered from an existing database of network interconnections (referred to here as the topology). An existing route within this topology is deemed to be non-viable due to some failure within the network. The invention will locate, if available, the optimal route around the network failure point utilizing short/long routing and route intersection sets.

The present invention provides a significant improvement in the speed of the restoration process by reducing the processing required to generate restoral routes.

In a typical network, the number of possible routes with a certain number of inter-node links increases by a factor of four with each additional link. For example, a network with 100 nodes may have 250 routes with one inter-node link, 1000 routes with two inter-node links, 4000 routes with three inter-node links, etc.

A factor of four is simply an example from a typical network, and is based on the fact that most nodes will have an average of four links. The common fact is that the number of possible routes with a certain number of inter-node links will increase significantly with each additional link.

The present invention reduces the processing required to identify a restoral route by exploiting this fact. A dynamic restoration system, when it detects and isolates the location of a failure, must first identify possible restoral routes, then calculate and compare the costs of each route, and select the route with the lowest cost. With the complexity of typical networks, identifying all the possible restoral routes and calculating the costs of each can be an enormous processing task.

The present invention reduces this task by greatly limiting the number of routes it looks for, while still maintaining the capability to find a needed restoral route. Once a source and target node are identified, a series of possible restoral routes that have network costs under a specified threshold of cost are identified. As merely an example, network costs may be reflected by the number of links that comprise a restoral route. In this example, a series of possible restoral routes that have less than a specified number of links are identified. These are referred to as short routes, and consist of left-hand routes and right-hand routes. The specified number of links can be selected by the user, and represents a level of configurability of the present invention. It is desirable to set this number low so that the invention will be limited in the number of routes it looks for.

The invention first attempts to find a restoral route from the source node to the target node that has less than the specified number of links. These are referred to as left-hand routes. If a left-hand route that makes it to the target node is found, then it is selected as the restoral route. If no left-hand route that makes it to the target node is found, then the invention attempts to find a restoral route from the target node to the source node that has less than the specified number of links. These are referred to as right-hand routes. If a right-hand route that makes it to the source node is found, then it is selected. If no right-hand route that makes it to the source node is found, then the invention scans all left-hand and right-hand routes that fell short of connecting the source and target nodes. It looks for intersection points between a left-hand route and a right-hand route. If such an intersection point is found, then the invention identifies the combination of the left-hand route and the right-hand route as a long route, and selects this long route as the restoral route.

In this manner, the invention can first search for a limited number of short routes that fall under the threshold of specified cost (i.e., number of links), thereby reducing the processing required. If no short route is found, then a long route is quickly identified by finding the intersection of a left-hand and right-hand route. Otherwise, by searching for a greater number of possible routes that exceed the threshold of specified number of links, more processing is required.

As an example of the reduction in processing required by the present invention, consider a network as previously described, in which the number of possible routes with a certain number of inter-node links increases by a factor of four with each additional link. For each additional link that is added to the threshold, the number of possible routes increases by a factor of $4^n$, where n is the number of additional links. If the specified threshold for the number of links in a short route is n, then the number of links for a long route is n+n, since a long route is simply a combination of two short routes. By searching for all possible short routes, a system would have searched for $(4^n+4^n)$m routes, where m represents the number of routes with one link. If it had to search for all possible long routes, it would have to search for $(4^{n+n})$m routes. This represents an increase in number of routes by a factor of:

$$\frac{4^{n+n}}{4^n + 4^n} = \frac{4^n 4^n}{2(4^n)} = \frac{4^n}{2}$$

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Although the invention is useful in a variety of route generation related applications, it can be described very distinctly in the context of dynamic network restoration.

Figure 1:
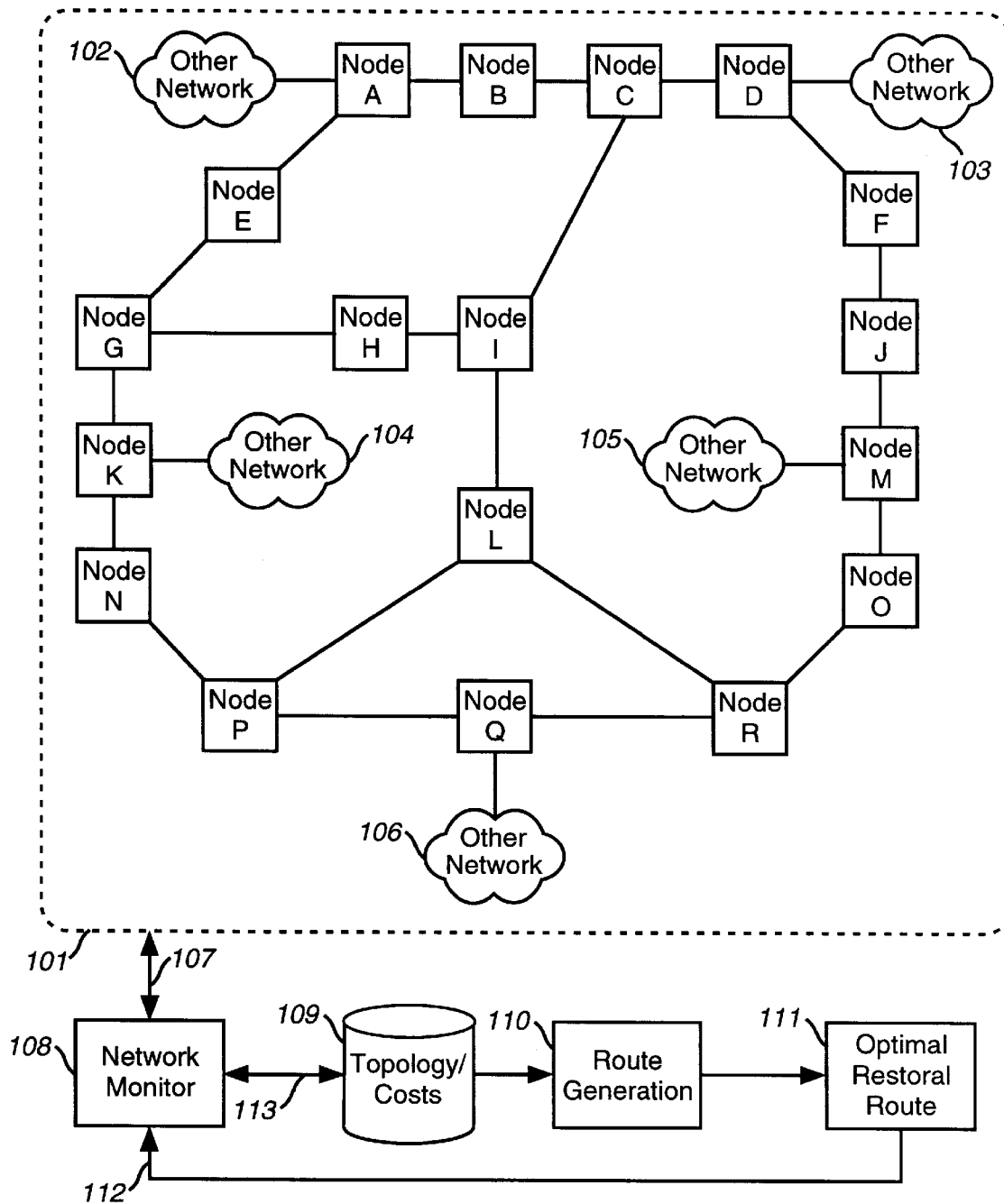
FIG. 1 is a block diagram showing the invention connected to a simplistic diverse interconnected network.

In FIG. 1, for example, network 101 consists of network capacity which traverses the network by connecting diverse network equipment elements (nodes), as in A, B, etc. Each piece of this network capacity which connects two diverse network equipment elements can be referred to as a segment, as in A-B, A-E, E-G, etc. In order to create network capacity which reaches from one network equipment element to another, as in A to H, segments are combined to create trunks. There are numerous routes within network 101 to connect network equipment element A to network equipment element H, as in A-E-G-H, A-B-C-I-H, A-E-G-K-N-P-L-I-H, etc.

Also, network 101 is deemed to have a quantity of connections across a segment which may be dynamically adjusted by some process external to the invention, thus expanding or reducing the quantity of connections across a segment. For instance, the A-E segment may have 2 connections between network equipment elements A and E. This would allow the generation of up to 2 restoral routes utilizing the A-E segment. However, network failures may cause some or all of these 2 A-E segment connections to become non-viable, forcing the restoral routes to change.

Further, network 101 consists of both trunks which are made up of segment connections which are carrying live traffic and of segments which are to be treated as spare capacity which may be available for creation of network restoral routes.

As can be seen at network equipment elements A, D, K, M and Q in network 101, these network equipment elements attach to other networks 102, 104, 105, 106 which, if utilized for restoral route generation would generate routes which are not viable for restoring traffic within network 101. However, this is a determination made for purposes of this presentation of the invention and the routing process contained within the invention is not aware of the non-viability of these routes which traverse the attached networks 102, 104, 105, 106. This is done to demonstrate how the invention attempts to reduce the traversing of non-viable routes.

Each segment connection (of which there can be more than one across any given segment) is assigned a cost which may be derived from numerous factors such as distance, quality of connection equipment, projected survivability, etc. This cost may be dynamically adjusted to increase or decrease the likelihood the routing process will utilize the segment connection in a restoral route.

For purposes of this presentation, a traffic trunk is deemed to exist between network equipment elements A and H, with the segments being A-E-G-H. When a portion of this traffic trunk is in failure, the trunk is said to be impacted between two network equipment elements. For example, if a network failure occurs between network equipment elements E and G, the A-E-G-H traffic trunk is said to be impacted on the E-G segment. Further, a network failure may or may not impact the spare segment connections in the same way that the traffic trunk is impacted. The availability of spare segment connections is detected/monitored by some process outside the scope of this invention and that external process will dynamically adjust the number of available segment connections as the network failures occur.

The optimal route is deemed to be the route which has the minimal accumulated cost across the route. The cost of each segment connection within the restoral route is accumulated in addition to other costs which may be induced into the process as needed. These additional costs might be length of segment connection, number of segments utilized from the original traffic trunk, number of spare segment connections utilized in the restoral route, etc.

The tables reflected in FIG. 1 as 109 "Topology/Costs" are database tables derived and maintained by existing processes that are known to those in the art, and are not, per se, part of the invention. These tables provide the Route Generation Process 110 with the information needed to properly understand the current state of the network and the availability of network capacity.

One particular embodiment, which is illustrated in FIG. 1, uses a Network Monitor process 108 to read in event data, such as alarms and topology data, from each network device. Network Monitor 108 may also be used to send commands to each network device for the purpose of rerouting traffic. The Topology/Costs database 109 is used to maintain network topology data. The Route Generation process 110 determines the Optimal Restoral Route 111, which is produced as a result of the Route Generation process 110 and fed back to the Network Monitor process 108 for the purpose of implementing the restoral route.

The Route Generation Process 110 is broken into the following routing stages:

Short/Long Routing

Source/Target Node Selection

Node Set Routing

Each stage utilizes the stage below it to actually generate the desired restoral route(s). Information is maintained from one stage to another and from one routing attempt to another in order to optimize the route generation time. Essentially, the process will learn which routes are least efficient the more routing occurs and will avoid them as more and more routes are generated.

Short/Long Routing will attempt to generate a route using two different methods, obviously referred to as Short Routing and Long Routing. Short routing is a single pass routing which attempts to generate a route from a Source Node (as in A on the previously defined traffic trunk) to one or more Target Nodes (as in E, G and H on the previously defined traffic trunk). The combination of the Source and Target Nodes creates a Node Set. If no Short route is available or the cost of the best short route is deemed too high, Long Routing will be attempted. The relationship of Short Routing and Long Routing will be defined below.

Source/Target Node Selection involves the selection of a Node Set which consists of one Source Node and one or more Target Nodes. Source and Target nodes are delineated by the point of impact on the traffic trunk. Source node selection includes the source node of the traffic trunk and each node up to the point of impact. Therefore, if the previously defined sample traffic trunk A-E-G-H is impacted on segment E-G there are potentially two Node Sets:

Set 1:

Source Node: E

Target Node(s): G, H

Set 2:

Source Node: A

Target Node(s): G, H

Further description of Node selection and Node Set creation can be found below.

Node Set Routing will attempt to find an optimal route utilizing topology database 109 which will connect the Source Node to one of the Target Nodes.

Short/Long Routing

The invention will attempt to find an optimal route from a node on one side of the network impact to a node on the other side of the network impact. Routing will occur for multiple node sets attempting to locate this optimal route. Each node set may generate an optimal route. The route which is most optimal will be maintained and updated as the routing process proceeds.

The invention attempts to reduce the number of non-viable routes which are examined during the Route Generation process 110. It does this by utilizing short and long routing. Short routing attempts to find an optimal route reaching from a Source node to a Target node (referred to in this presentation as left-hand routing). In short routing, a route is attempted from the Source node on a node-by-node basis, calculating the accumulative cost for each inter-node segment. When the accumulative cost exceeds a pre-defined threshold for what will be considered "viable routes", the short route terminates at that point. If the Target node has not been reached, then another short route is attempted from the Source node in the same manner. This process proceeds until all possible left-hand routes have been attempted.

If no left-hand route exists or the cost of the optimal left-hand route is not. deemed optimal, then short routing is attempted from the opposite direction, i.e., from the Target node to the Source node (referred to in this presentation as right-hand routing ). In the example traffic trunk A-E-G-H with an impact on segment A-E, left hand routing would be from Source A to Targets E/G/H. Conversely., right hand routing would be from E/G/H to A.

Figure 2:
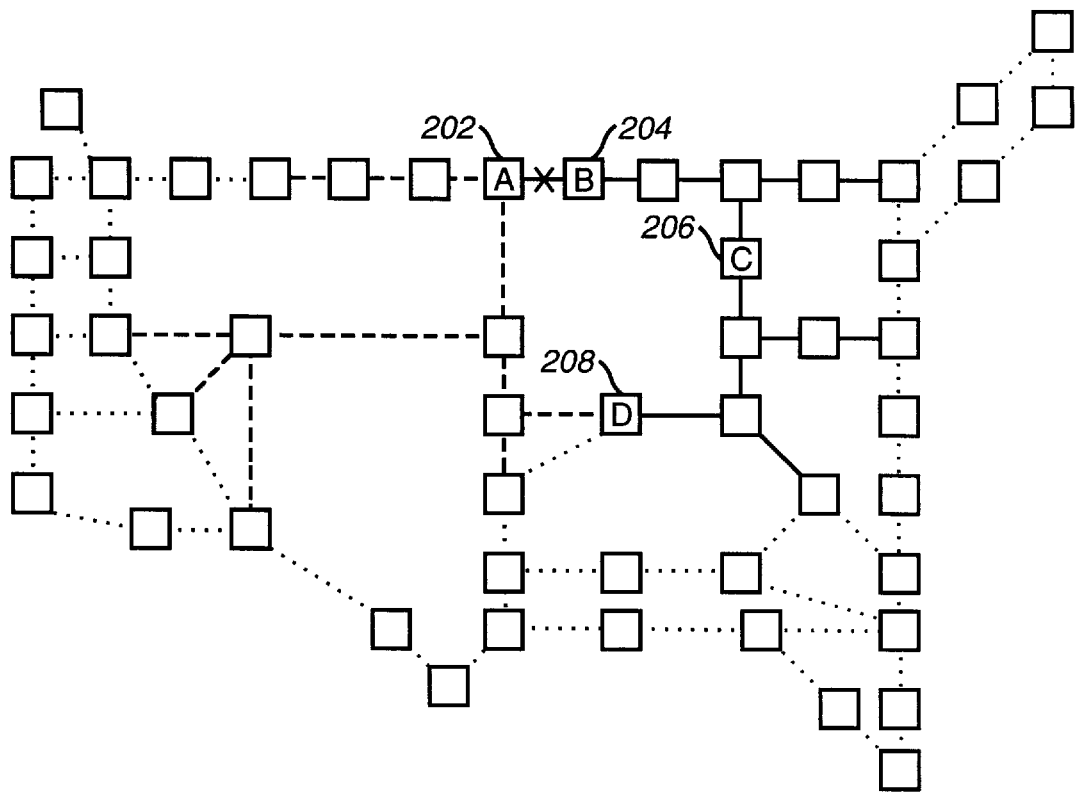
FIG. 2 shows the effect of utilizing short/long routing on the number of potential routes within a large network.

Long routing makes use of the intersection of routes between left hand routing and right hand routing. This allows the routing possibilities to be greatly reduced. FIG. 2 shows that given some restriction on route (thereby defining a short route) which might include length, cost, number of nodes, etc., and the utilization of route intersection sets between left hand routes and right hand routes, a significant number of routes which are non-viable are eliminated. The process can be tuned to maximize the exclusion of non-viable routes by adjusting the definition of a viable short route.

Referring to FIG. 2 as an example, a traffic trunk is defined between Node A 202 and Node C 206, and identified as traffic trunk A-B-C. This traffic trunk is impacted (i.e., fiber cut) between Node A 202 and Node B 204. The Route Generation process 110 will determine the optimal restoral route to restore traffic on this trunk by routing around this impacted segment. In this example, Node A 202 is identified as the Source node and Node C 206 is identified as the Target node. Short routing will first attempt to complete a left-hand route, that is, a route from Node A 202 to Node C 206. It establishes a node-by-node route, calculating the accumulative costs along the way. In this example, suppose the accumulative costs exceed the pre-defined threshold for "viable routes" after making three inter-node hops. All viable left-hand routes are identified in FIG. 2 by dashed lines. As shown, no left-hand routes complete to the Target node, Node C 206.

Short routing will then attempt to complete a right-hand route, that is, a route from Node C 206 to Node A 202. This is performed in the same manner as attempting left-hand routes.

In right-hand routing, a node-by-node route is established, calculating the accumulative costs along the way. When the pre-defined threshold is exceeded and Node A 202 has not yet been reached, another right-hand route is attempted. All viable right-hand routes are identified in FIG. 2 by solid lines. As shown, no right-hand routes complete to the Target node, Node A 202.

If no viable Short routes are established from the Source node to the Target node, Long routing is performed. In Long routing, all intersection points between left-hand and right-hand short routes are identified. In FIG. 2, Node D 208 is identified as an intersection of such short routes. Thus, these two particular short routes are combined to produce a viable route; all other routes are considered non-viable and are excluded.

Source/Target Node Selection

It is initially important to determine which side of the impact point is to be treated as the Source side and which is to be treated as the Target side. While there are many ways of selecting a Source side, the easiest and most efficient within the Node Set Routing stage is to treat the side of the traffic trunk with the most nodes as the Target side. Thus, with the example traffic trunk A-E-G-H and an impact point on segment A-E, the Source side would consist of node A and the Target side would consist of nodes E, G, H.

As the Node Set Routing stage traverses the network topology, it will record whether or not two nodes are connectable with a route which has an acceptable cost, defining whether the node pair is viable. For instance, while a route may exist to connect nodes A and I, there may be no viable route for connecting nodes A and O (possibly due to excessive cost or unavailability of segment connections).

The Source/Target Node Selection stage will successively select a Source Node and corresponding Target Node(s). This stage will make use of the viability information provided by Node Set Routing to drop nodes from inclusion as Target nodes for the current Source node. If there are no resulting Target nodes, the next node on the Source side will be examined in an attempt to find a potentially viable Source/Target Node Set. In addition to viability, if a previous Node Set has, generated an optimal route with a cost lower than one recorded for a Source/Target node pair under consideration for the current Node Set, then the Target node will be dropped from the current Target set.

For the example traffic trunk A-E-G-H the following impact points would result in the related Source/Targets:

| Impacted | Source | Target |
| --- | --- | --- |
| A–E | A | E/G/H |
| E–G | A | G/H |
|  | E | G/H |
| G–H | H | A/E/G |

As described previously, one or more of the target nodes might be dropped due to non-viability in the Source to Target node combination previously identified in the routing stage.

Node Set Routing

Once a Source/Target Node Set is defined, the Node Set Routing stage will attempt to find a viable route which results in a restoral route. The Node Set Routing performs a restricted exhaustive search for a connection route utilizing the current network topology starting from the Source node and attempting to reach one of the target nodes. However, the search is restricted based on the following:

If the cost to reach the next node will cause the accumulated cost of the current route to exceed any already identified optimal route, the node will not be traversed.

If the next node already exists in the current route, the node will not be traversed, eliminating backhauls.

If the next node exists as any Source node on the traffic trunk, the node will not be traversed.

The next node will also not be traversed if any additional restrictions are met such as, but not limited to:

Overall length of the current route

Overall cost of the current route

As nodes are traversed, the cost of the current route is maintained. The cost of the current route from the source node to the new node is recorded along with the route for each node pair (provided the cost does not exceed a previously determined route for the same node pair, if any). Thus, as the generation of one restoral route is attempted, many potential restoral routes are recorded. This information will be used in all three stages of route generation.

When a target node is encountered, the cost of the route from the source node to the target node is compared to any previous optimal route identified. If the new route is more optimal, it is retained as the new optimal route and routing continues. The routing process may be terminated prematurely by inducing a limit on the number of routes which must be found before the current optimal route is acceptable.

This can be tuned to provide the best optimal route possible without having to perform an exhaustive analysis of all possible routes.

Route generation will cease when all routes have been examined between the source and target nodes (unless a threshold of generated routes is induced) or the cost of the current optimal route is the best possible (indicating further searching could only generate comparable or worse routes).

Flowcharts

FIGS. 3–6b are process flowcharts showing the operation of the Route Generation Process, as qualitatively discussed hereinbefore.

Figure 3:
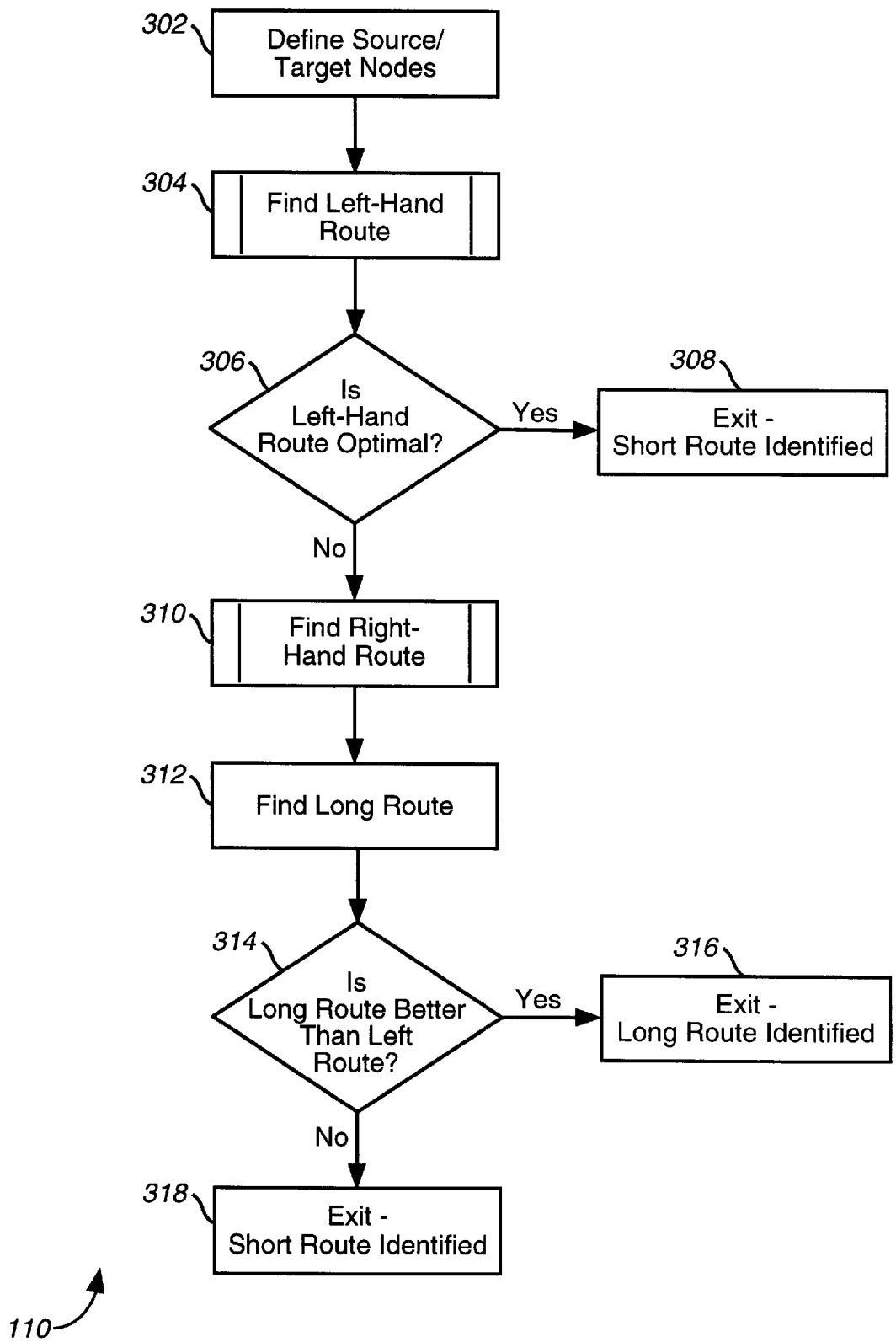
FIGS. 3–6b are process flows showing the operation of the Route Generation process.

FIG. 3 shows an overall route generation flowchart that was previously indicated by reference numeral 110 in FIG. 1. The initial step 302 defines the source/target nodes of an impacted trunk. This step involves the selection of a Node Set which consists of one Source Node and one or more Target Nodes. Source and Target Nodes are delineated by the point of impact on the traffic trunk. Source Node selection includes the Source Node of the traffic trunk and each node up to the point of impact.

The process of the present invention attempts to find an optimal route from a node on one side of the network impact to a node on the other side of the network impact. Each Node Set may generate an optimal route. The route which is most optimal will be maintained and updated as the routing process proceeds.

The present process attempts to reduce the number of non-viable routes which are examined during the route generation process 110. It does this by utilizing short and long routing.

As FIG. 3 indicates, step 304 finds a left-hand route utilizing the topology database 109 (FIG. 1) which will connect the Source Node to one of the Target Nodes. The process of finding a left-hand route is dealt with in greater detail in connection with the flow diagram of FIG. 4.

Figure 4:
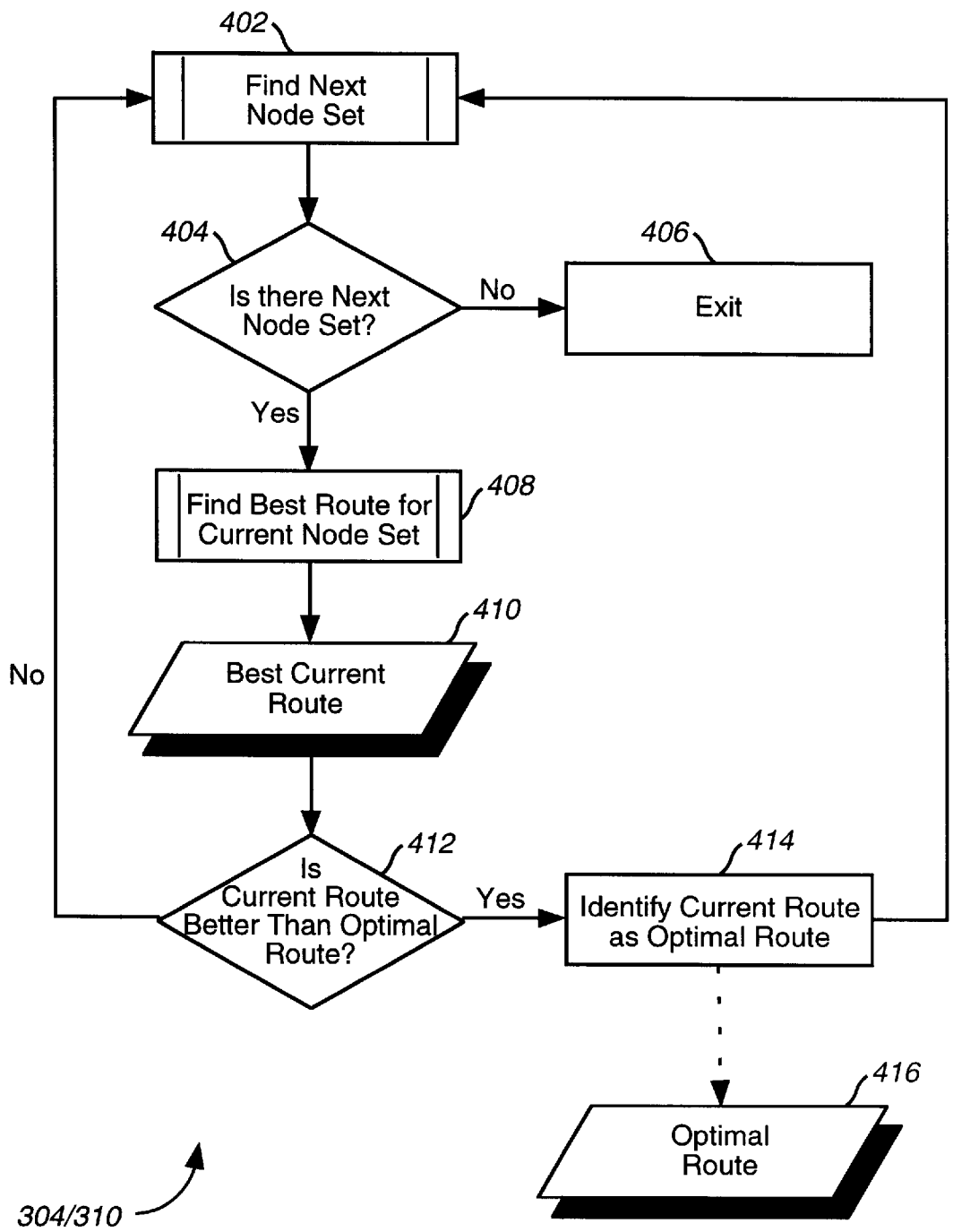

In step 306, a determination is made as to whether the left-hand route is optimal. That is, whether a left-hand route exists and whether the cost of the left-hand route is beyond the range of predetermined values. If the left-hand route is determined to be optimal at step 306, the process ends and the short route is, identified. If, on the other hand, the left-hand route is found to be non-optimal, the process continues with step 310, which serves to find a right-hand route. That is, a route is attempted from the Target Node to the Source Node. The individual steps for this sub-process is shown in FIG. 4. The main process then continues with the finding of a long route at step 312. Long routing makes use of the intersection of routes between left-hand routing and right-hand routing. This allows the routing possibilities to be greatly reduced. In step 314, a found long route is compared with a left-hand route in terms of length, cost, number of nodes, etc. If the long route is determined to be better than the left route, the process advances to step 316, where the long route is identified and the process is ended. If the long route is not determined to be better, the process continues to step 318 and the short route is identified.

FIG. 4 is a sub-process flowchart showing the steps involved in finding left-hand and right-hand routes. The initial step 402 is to find a next Node Set which consists of one Source Node and one or more Target Nodes. It will be recalled that Source and Target Nodes are delineated by the point of impact on the traffic trunk. Source Node selection includes the Source Node of the traffic trunk and each node up to the point of impact. The individual steps of a sub-process for finding a next Node Set is shown in FIG. 5.

The sub-process shown in FIG. 4 continues with step 404 where a determination is made as to whether a next Node Set exists. If all Node Sets have been exhausted, the process exits at step 406. However, if it exists, a sub-process, indicated at step 408, commences to find the best route for a current Node Set. The sub-process at step 408 is dealt with in greater detail in connection with the following description of FIG. 6a. Once the best current route is determined in step 410, it is compared with a previously recorded optimal route from a previous Node Set at step 412. If the current route is better than the previous optimal route, the current route is identified as an optimal route at step 414 and recorded as such at step 416.

Figure 5:
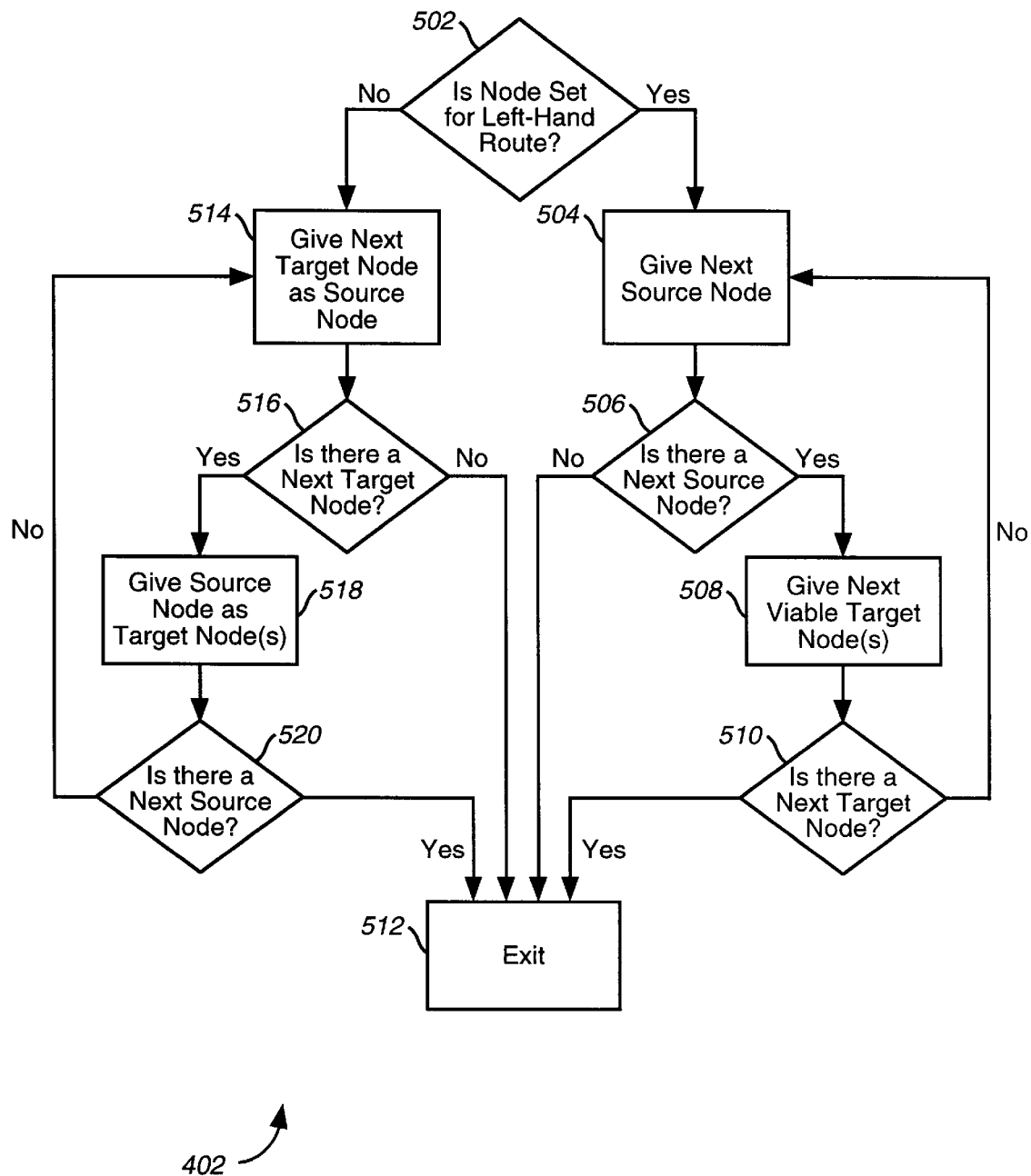

FIG. 5 illustrates the flowchart of sub-process 402 of FIG. 4 and functions to find a next Node Set. Initial step 502 determines if a particular Node Set is for a left-hand route. It will be recalled that this involves short routing reaching from a Source Node to a Target Node. If the answer is affirmative, the sub-process advances to step 504 where the next Source Node is given. If the answer is negative, the sub-process continues to step 514 where a next Target Node is given as a Source Node. Both branches advance from steps 504, 514 to decisional steps 506, 516, respectively, to determine whether a next Source/Target Node exists. If the answer to either is no, the sub-process exits at step 512. If the decision is positive, the sub-process continues along the respective branch to either step 508 or 518. If step 508 is in play, the next viable Target Node is given. This is followed by step 510, where there is a determination as to whether or not there is a next Target Node. If there is not, the right illustrated branch returns to step 504 where the next Source Node is given. If the determination in step 510 is affirmative, the sub-process exits at step 512.

If the left branch is being pursued at step 516, a positive determination that a next Target Node exists advances the sub-process to step 518 where a Source Node is given as a Target Node. This is followed by a determination 520 as to whether a next Source Node exists. If the answer is negative, the sub-process reiterates to step 514 to give the next Target Node as a Source Node. If the decisional step 520 results in an affirmation, the sub-process exits at step 512.

Figure 6A:
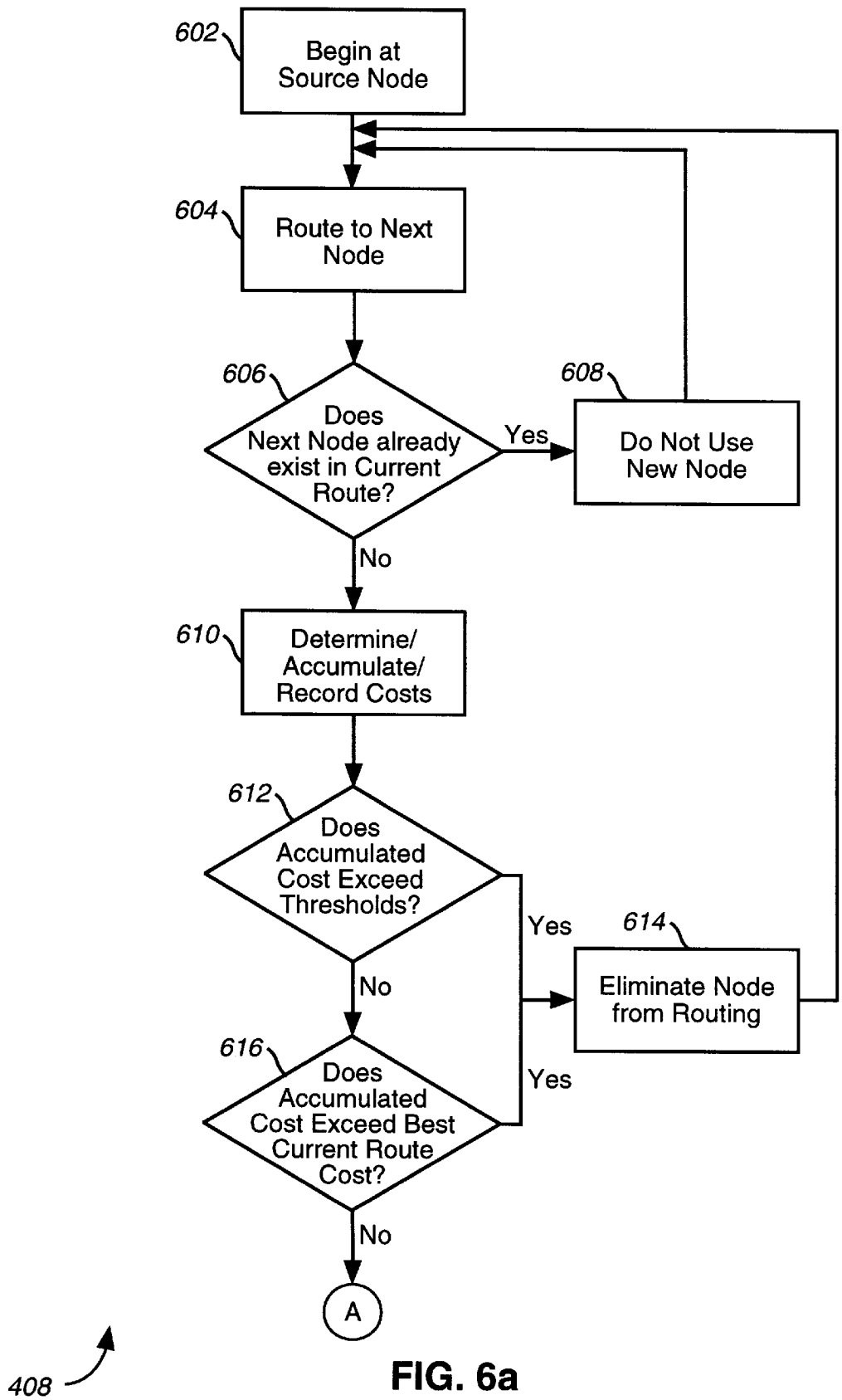
Figure 6B:
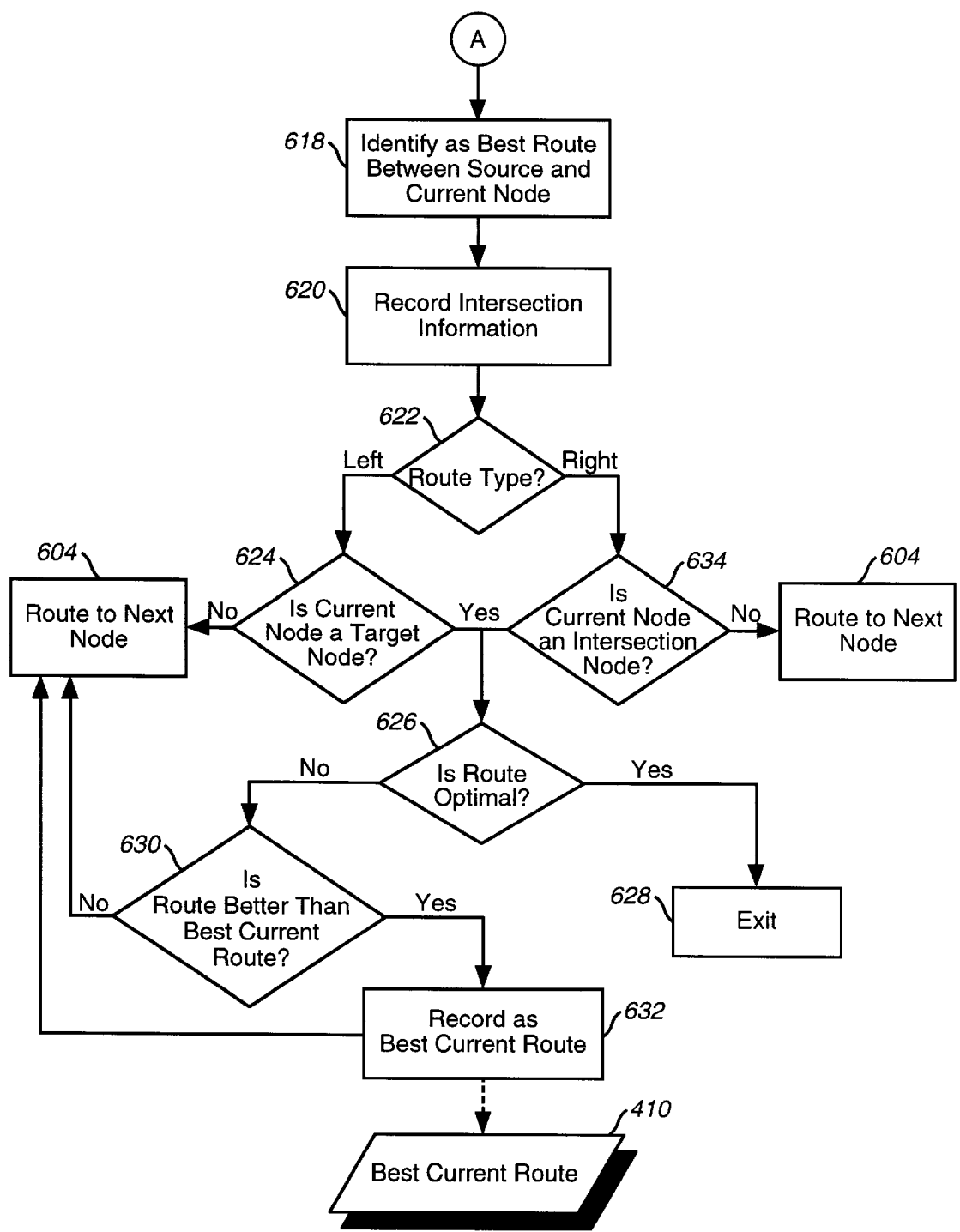

To find the best route for a current Node Set, as depicted in step 408 of FIG. 4, a sub-process takes place, as illustrated in FIGS. 6a and 6b. Referring to FIG. 6a, an initial step 602 begins the sub-process at a Source Node. The following steps will minimize the non-viable routes so that an optimum route may be quickly ascertained. Step 604 determines the route to the next node and, from there, step 606 decides whether the next node already exists in a common route.

If the answer is affirmative, this new node is rejected at step 608 and the sub-process reiterates to step 604 to find the route to the next viable node. If the decision in step 606 is negative, the sub-process advances to step 610 for the determination of accumulated costs along this route. This information is recorded and in step 612 the accumulated cost is compared to a pre-established cost threshold of acceptability. If it exceeds the threshold, the node under consideration is rejected at step 614 and the sub-process reiterates back to step 604 where a route to the next node is selected. However, if the threshold is not exceeded, step 616 comes into play and this compares the accumulated cost to a current best route cost. If the accumulated cost does exceed the best current route cost, then the node is eliminated from routing at step 614 and the sub-process reiterates to step 604. If the accumulated cost does not exceed the best current route cost, the sub-process continues with FIG. 6b, and, more particularly, step 618 which identifies the source and current node as a best source.

Based on the topology database (109), intersection information regarding this best route is recorded. Step 622 determines the route type, namely, whether it is a left- or right-hand route. If it is a right-hand route, the sub-process continues to step 634 where a determination is made as to whether the current node is an intersection node. If the answer is negative, step 604 extends the route to the next node. If the decision in step 634 is positive, a decision is made as to whether the route is optimal in accordance with preselected criteria in step 626. If it is, the sub-process is terminated at step 626. If it is not optimal, the sub-process continues to step 630, where a comparison is made between the route under investigation and the best current route. If the route under investigation is better, it is recorded as a best current route at step 632, and the process reiterates to step 604. If it isn't better, it is not recorded. Subsequently, the sub-process returns to step 604 where a route with the next node is selected. Step 410 indicates the determination of a best current route, as required in the finding of an optimal route in FIG. 4.

Thus, as will be appreciated from the foregoing discussion, the process of the present invention generates telecommunications network restoral routes which utilize route intersection sets to reduce the number of non-viable routes which must be examined during route generation. The process is flexible in relation to a dynamically changing topology and the costs of portions of the network topology by including costing as an integral part of the route generation stage.

It should be understood that the invention is not limited to the exact details of construction shown and described herein for obvious modifications will occur to persons skilled in the art.

We claim:

1. A process for generating an optimal restoral route for a telecommunications network having a diverse interconnected set of nodes arranged in a dynamically changing topology updated in a database, the network impacted at a failure point between source and target nodes, the process comprising the steps:

identifying all possible short routes, which are those that accumulate less than a specified maximum threshold of cost, and include either a left-hand route from the source node to the target node, or a right-hand route from the target node to the source node; and if no short route is found that connects the source and target nodes, then identifying long routes by identifying an intersection of right-hand and left-hand routes.

2. A process for generating an optimal restoral route for a telecommunications network having a diverse interconnected set of nodes arranged in a dynamically changing topology updated in a database, the network impacted at a failure point between source and target nodes, the process comprising the steps:

(a) defining the source and target nodes separated by the failure point;

(b) finding a left hand short route between the source and target nodes;

(c) assessing operational costs along the route;

(d) determining, from the costs, whether the route is optimal;

(e) exiting the process if the route is optimal and identifying the left hand short route.

3. The process set forth in claim 2 further comprising the steps:

(f) continuing as follows with the process if the route is not optimal;

(g) finding a right hand route between the source and the target nodes;

(h) finding a long route between the source and target nodes; and (i) determining whether the long route is superior to the left hand route.

4. The process set forth in claim 3 further comprising the steps:

(j) exiting the process if the long route is superior, and identifying the long route as an optimal route; or (k) exiting the process if the long route is not superior, and identifying the short route as an optimal route.

5. The process of claim 2 wherein steps (b) and (g) respectively comprise the subprocess steps:

finding a next node set between the source and target nodes to be evaluated;

exiting the subprocess if there is no next node set;

continuing with the subprocess if there is a next node set;

finding a best route for the current node set;

comparing a current route to a previous optimal route;

returning to the step of finding a next node set if the comparison is unfavorable; and identifying the current route as an optimal route in the event the comparison is favorable.

6. The process of claim 5 wherein the step of finding a next node set comprises the subprocess steps:

determining if an instant node set is for a left hand route;

if the determination is positive, continuing as follows— processing the next source node from the instant node set;

determining whether there is a next source node;

exiting the subprocess if the determination is negative;

if the determination is affirmative, processing the next viable target node;

determining if there is a next target node;

exiting the subprocess if there is a next target node, or returning to processing a further next source node if there is not;

if the determination is negative, continuing as follows— processing the next target node as a source node;

determining whether there is a next target node;

exiting the subprocess if the determination is negative;

if the determination is affirmative, processing the source node as the next target node;

determining if there is a next source node;

exiting the subprocess if there is a next source node, or returning to processing a new next target node as the next source node if there is not.

7. The process of claim 5 wherein the step of finding a best route for a current node set comprises the subprocess steps:

beginning the subprocess at a source node;

determining a route to a next node;

determining whether the next node already exists in a current route and if it does determining the operational cost for a new route segment from the database;

accumulating the cost over the route, including the next node;

recording the cost over the route;

comparing the accumulated cost to a preselected threshold;

if the accumulated cost exceeds the threshold, continuing as follows— eliminating the next node from routing consideration; and returning to the step of determining a route to the next node;

if the accumulated cost does not exceed the threshold, continuing as follows— determining whether the accumulated cost exceeds the best current route cost;

if the determination is affirmative, eliminating the next node from routing consideration and reiterating the subprocess to select a new route to a new next node; and if the determination is negative, identifying the new route as the best route between the source and the current node.

8. The process of claim 7 further comprising the subprocess steps:

recording intersection information, from the database, between the new best route and other routes connecting the source an current node;

determining whether the route is a left hand route or a right hand route;

if it is a right hand route, continuing with the following—
determining whether the current node is an intersection node and routing to the next node if it is not; or if it is, alternatively determining if the route is optimal;
exiting the subprocess if the route is optimal; or if it is not, alternatively determining if the route is better than the best current route;
routing to a next node if the route is not better; or if it better, alternatively recording the route as a best current route;

if it is a left hand route, continuing with the following—
determining whether the current node is a target node and routing to the next node if it is not; or if it is, alternatively determining if the route is optimal;
exiting the subprocess if the route is optimal; or if it is not, alternatively determining if the route is better than the best current route; and
routing to a next node if the route is not better; or if it better, alternatively recording the route as a best current route.

* * * * *